United States Patent
Akachi et al.

(10) Patent No.: US 12,495,186 B2
(45) Date of Patent: Dec. 9, 2025

(54) CONTENT OUTPUT DEVICE AND CONTENT OUTPUT METHOD

(71) Applicant: HONDA MOTOR CO., LTD., Tokyo (JP)

(72) Inventors: Masashi Akachi, Tokyo (JP); Yuto Kojima, Tokyo (JP); Kentaro Yonei, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/978,919

(22) Filed: Dec. 12, 2024

(65) Prior Publication Data

US 2025/0211824 A1    Jun. 26, 2025

(30) Foreign Application Priority Data

Dec. 26, 2023    (JP) .................................. 2023-219609

(51) Int. Cl.
| | |
|---|---|
| *H04N 21/462* | (2011.01) |
| *H04N 21/414* | (2011.01) |
| *H04N 21/441* | (2011.01) |
| *A63F 13/52* | (2014.01) |

(52) U.S. Cl.
CPC ..... *H04N 21/462* (2013.01); *H04N 21/41422* (2013.01); *H04N 21/441* (2013.01); *A63F 13/52* (2014.09)

(58) Field of Classification Search
CPC ......... H04N 21/2146; H04N 21/41422; H04N 21/441; H04N 21/44218; H04N 21/458; H04N 21/462; H04N 21/4781; A63F 13/52
See application file for complete search history.

(56) References Cited

U.S. PATENT DOCUMENTS

| | | | |
|---|---|---|---|
| 7,000,242 B1* | 2/2006 | Haber | G06Q 40/12 725/43 |
| 7,089,241 B1* | 8/2006 | Alspector | H04L 51/212 |
| 8,095,597 B2* | 1/2012 | Rawat | H04L 51/212 709/206 |
| 8,234,561 B1* | 7/2012 | Bourdev | G06F 40/30 715/224 |

(Continued)

FOREIGN PATENT DOCUMENTS

JP    2022-105997 A    7/2022

*Primary Examiner* — Michael B. Pierorazio
(74) *Attorney, Agent, or Firm* — Rankin, Hill & Clark LLP

(57) ABSTRACT

A content output device includes an output unit configured to output, as target content, content designated by a passenger of a mobile object to a display device, an identification unit configured to acquire identification information regarding content viewing for each passenger seated on each seat of the mobile object, a determination unit configured to determine whether or not to permit output of the target content by the output unit on the basis of the identification information and restriction information regarding viewing of the target content, and a suggestion unit configured to make a suggestion related to output of content to a passenger. When the determination unit determines not to permit the output of the target content, the suggestion unit suggests, to the passenger, alternative content to the target content or a countermeasure for permitting the output of the target content.

13 Claims, 4 Drawing Sheets

(56) References Cited

U.S. PATENT DOCUMENTS

| | | | | |
|---|---|---|---|---|
| 8,311,277 | B2* | 11/2012 | Peleg | G06F 16/7837 |
| | | | | 382/103 |
| 8,392,288 | B1* | 3/2013 | Miller | G06Q 30/06 |
| | | | | 705/26.81 |
| 8,589,984 | B1* | 11/2013 | Acharya | H04N 21/4722 |
| | | | | 725/60 |
| 9,058,523 | B2 | 6/2015 | Merkel | G08B 13/19652 |
| 9,251,416 | B2* | 2/2016 | Wu | G06T 7/254 |
| 10,803,334 | B1* | 10/2020 | Lin | G08B 25/10 |
| 2002/0066050 | A1* | 5/2002 | Lerman | G06F 11/1076 |
| | | | | 714/E11.034 |
| 2002/0069405 | A1* | 6/2002 | Chapin | H04N 21/47205 |
| | | | | 725/135 |
| 2005/0149910 | A1* | 7/2005 | Prisament | G06F 8/51 |
| | | | | 717/115 |
| 2006/0173750 | A1* | 8/2006 | Naley | G06Q 20/12 |
| | | | | 705/26.81 |
| 2006/0190481 | A1* | 8/2006 | Alspector | H04L 51/212 |
| 2006/0282332 | A1* | 12/2006 | Pfleging | G06Q 20/209 |
| | | | | 705/24 |
| 2006/0291695 | A1* | 12/2006 | Lipton | G06V 20/52 |
| | | | | 382/103 |
| 2007/0127774 | A1* | 6/2007 | Zhang | G08B 13/19602 |
| | | | | 382/103 |
| 2007/0162258 | A1* | 7/2007 | Lin | G06Q 10/06 |
| | | | | 702/182 |
| 2008/0143689 | A1* | 6/2008 | Foo | G06F 3/0443 |
| | | | | 345/173 |
| 2008/0295129 | A1* | 11/2008 | Laut | H04N 21/812 |
| | | | | 725/34 |
| 2008/0298645 | A1* | 12/2008 | Doi | G06F 21/32 |
| | | | | 382/118 |
| 2009/0060278 | A1* | 3/2009 | Hassan-Shafique | |
| | | | | G08B 13/19602 |
| | | | | 382/103 |
| 2009/0220149 | A1* | 9/2009 | Menadeva | G11B 27/034 |
| | | | | 382/199 |
| 2009/0228920 | A1* | 9/2009 | Tom | H04N 7/163 |
| | | | | 725/35 |
| 2010/0131385 | A1* | 5/2010 | Harrang | G06Q 30/0631 |
| | | | | 705/26.1 |
| 2010/0183227 | A1* | 7/2010 | Park | G06V 40/103 |
| | | | | 382/195 |
| 2010/0278453 | A1* | 11/2010 | King | G06F 40/197 |
| | | | | 715/230 |
| 2011/0137753 | A1* | 6/2011 | Moehrle | G06V 20/49 |
| | | | | 725/60 |
| 2011/0138326 | A1* | 6/2011 | Roberts | G06Q 30/0243 |
| | | | | 715/808 |
| 2011/0157067 | A1* | 6/2011 | Wagner | G06F 3/04166 |
| | | | | 345/174 |
| 2011/0283189 | A1* | 11/2011 | McCarty | H04N 21/4532 |
| | | | | 715/810 |
| 2011/0295988 | A1* | 12/2011 | Le Jouan | G06F 21/31 |
| | | | | 709/223 |
| 2012/0079049 | A1* | 3/2012 | Rawat | H04L 51/212 |
| | | | | 709/206 |
| 2012/0084811 | A1* | 4/2012 | Thompson | H04N 21/812 |
| | | | | 725/34 |
| 2013/0086465 | A1* | 4/2013 | Boudville | G06Q 20/3276 |
| | | | | 235/375 |
| 2018/0144476 | A1* | 5/2018 | Smith | G06T 7/174 |
| 2020/0077035 | A1* | 3/2020 | Yao | G06V 20/52 |
| 2020/0145590 | A1* | 5/2020 | Elboher | G06T 7/70 |
| 2020/0211348 | A1* | 7/2020 | Wang | H04N 23/61 |
| 2020/0233940 | A1* | 7/2020 | Edwards | H04L 9/0637 |
| 2021/0124959 | A1* | 4/2021 | Kuehnle | H04N 23/651 |
| 2021/0309259 | A1* | 10/2021 | Stumpf | G06V 40/20 |
| 2022/0004778 | A1* | 1/2022 | Ishiko | G06V 20/59 |
| 2022/0114212 | A1* | 4/2022 | Ventimiglia | G06V 20/56 |
| 2022/0114245 | A1* | 4/2022 | Krishan | G06F 21/32 |
| 2022/0212658 | A1 | 7/2022 | Nagata et al. | |

* cited by examiner

CONTENT OUTPUT DEVICE AND CONTENT OUTPUT METHOD

INCORPORATION BY REFERENCE

The present application claims priority under 35 U.S.C. § 119 to Japanese Patent Application No. 2023-219609 filed on Dec. 26, 2023. The content of the application is incorporated herein by reference in its entirety.

BACKGROUND

Technical Field

The present invention relates to a content output device and a content output method.

Related Art

In these years, efforts are actively made to provide access to a sustainable transportation system that gives consideration to vulnerable people such as elderly people, handicapped people, and children among traffic participants. In order to achieve this, research and development are focused on further improving traffic safety and convenience through development of comfortability improvement on a vehicle.

JP 2022-105997 A describes a system that adjusts setting of a vehicle on the basis of sensor data regarding identification of an occupant in the vehicle and a position of the occupant. In this system, content is presented according to, for example, occupant preferences and access credentials.

SUMMARY

By the way, in improving comfortability of a vehicle, even in a case where a plurality of persons having different ages or a plurality of persons having different access credentials to a content viewing service get on the vehicle at the time of outputting content in the vehicle, it is a problem to perform content output according to the desires of individual passengers as much as possible while considering viewing age restriction and access restriction of the content.

In order to solve the above problem, an object of the present application is to enable a mobile object in which a plurality of persons ride as passengers to output content according to the desires of individual passengers as much as possible while considering viewing restriction and access restriction of the content. In addition, accordingly, the present application contributes to development of a sustainable transportation system.

An aspect of the present invention is a content output device including an output unit configured to output, as target content, content designated by a passenger of a mobile object to a display device mounted in the mobile object, an identification unit configured to identify each of passengers seated on each of seats of the mobile object and acquire identification information regarding content viewing for each of the passengers, and a determination unit configured to determine whether or not to permit output of the target content by the output unit on the basis of the identification information and restriction information regarding viewing of the target content, the content output device further includes a suggestion unit configured to make a suggestion related to output of content to a passenger, wherein when the determination unit determines not to permit the output of the target content, the suggestion unit suggests substitute content for the target content or suggests a countermeasure for permitting the output of the target content to the passenger.

According to another aspect of the present invention, the identification information generated by the identification unit includes information of a seat position of a corresponding passenger in an interior of the mobile object, the output unit sets, as a target display device to which the target content is to be output, a display device arranged at a position in the interior visually recognizable from a seating position of a target user who is a passenger designating the target content, and the determination unit determines, on the basis of the identification information, whether or not a restriction target person whose viewing of the target content is to be restricted according to the restriction information is included in passengers sitting on seats where the target display device is visually recognizable, and does not permit output of the target content to the target display device when the restriction target person is included.

According to another aspect of the present invention, the identification information generated by the identification unit includes information on whether or not a corresponding passenger is in a viewable state in which the passenger can view content, and the determination unit excludes a passenger who is not in the viewable state from a target of determination as to whether or not the passenger is the restriction target person.

According to another aspect of the present invention, when the determination unit determines not to permit output of the target content, the suggestion unit suggests, to a passenger, content, which has the same details as details of the target content and does not make a passenger seated on a seat where the target display device is visually recognizable be a target of the viewing restriction on the basis of restriction information of the content, as the substitute content.

According to another aspect of the present invention, when the determination unit determines not to permit output of the target content, the suggestion unit suggests, to a passenger, content, which belongs to the same category as a category of the target content and does not make a passenger seated on a seat where the target display device is visually recognizable be a target of the viewing restriction on the basis of restriction information of the content, as the substitute content.

According to another aspect of the present invention, the identification information generated by the identification unit includes service subscription information that is information of a viewing service to which a corresponding passenger subscribes and connection information that is information of a connection relationship with another passenger, and when the target content is content provided from one viewing service to which the target user subscribes, the determination unit determines whether or not to permit output of the target content by the output unit on the basis of the service subscription information and the connection information of each passenger.

According to another aspect of the present invention, when the target content is content provided from one viewing service to which the target user subscribes, and when a person not having a predetermined connection relationship determined in advance with the target user is included in passengers seated on seats where the target display device is visually recognizable on the basis of the service subscription information and the connection information of each passenger, the determination unit determines that the person not having the connection relationship to be a restriction target person to be restricted from viewing the target content, and does not permit output of the target content by the output unit.

According to another aspect of the present invention, even when the target content is content provided from one viewing service to which the target user subscribes and a person not having the predetermined connection relationship with the target user is included in passengers seated on seats where the target display device is visually recognizable, when all passengers not having the predetermined connection relationship with the target user among the passengers seated on the seats where the target display device is visually recognizable subscribe to the one viewing service or are persons having the predetermined connection relationship with another passenger subscribing to the one viewing service, the determination unit permits output of the target content by the output unit.

According to another aspect of the present invention, in a case where the target content is content provided from one viewing service, and the determination unit determines not to permit the output of the target content on the basis of the service subscription information and the connection information included in the identification information, when another viewing service different from the one viewing service provides the same content as the target content, the suggestion unit suggests the same content as the target content provided by the other viewing service to the passenger as the substitute content under condition that all passengers seated on the seats where the target display device is visually recognizable subscribe to the other viewing service or have the predetermined connection relationship with a passenger subscribing to the other viewing service.

According to another aspect of the present invention, when the determination unit does not permit the output of the target content by the output unit, the suggestion unit suggests that the restriction target person or the target user move seats so that the restriction target person is not allowed to visually recognize the target content as a suggestion of the countermeasure for permitting the output of the target content.

According to another aspect of the present invention, in a case where the determination unit does not permit the output of the target content by the output unit, when seat movement of a plurality of passengers is required to permit the output of the target content, the suggestion unit suggests change of seat arrangement of the passengers in the interior of the mobile object as a suggestion of the countermeasure for permitting the output of the target content.

According to another aspect of the present invention, when the determination unit determines to permit the output of the target content and the passengers of the mobile object include the restriction target person, the output unit decreases an output level of reproduction sound of the target content to a level lower than a predetermined level or outputs the reproduction sound toward a seating position of the target user by a directional speaker.

Another aspect of the present invention is a content output method executed by a computer of a content output device configured to output content designated by a passenger of a mobile object to a display device mounted in the mobile object, the content output method including an output step of outputting, as target content, content designated by a passenger of the mobile object to the display device, an identification step of identifying each of passengers seated on each of seats of the mobile object and acquiring identification information regarding content viewing for each of the passengers, and a determination step of determining whether or not to permit output of the target content in the output step on the basis of the identification information and restriction information regarding viewing of the target content, the content output method further includes a suggestion step of making a suggestion related to output of content to a passenger, wherein in the suggestion step, when it is determined not to permit the output of the target content in the determination step, substitute content for the target content or a countermeasure for permitting the output of the target content is suggested to the passenger.

According to the present invention, it is possible to enable a mobile object in which a plurality of persons ride as passengers to output content according to the desires of individual passengers as much as possible while considering viewing restriction and access restriction of the content.

DETAILED DESCRIPTION

1. Embodiment

Hereinafter, an embodiment of the present invention will be described with reference to the drawings.
[1.1 Overall Outline]

Figure 1:
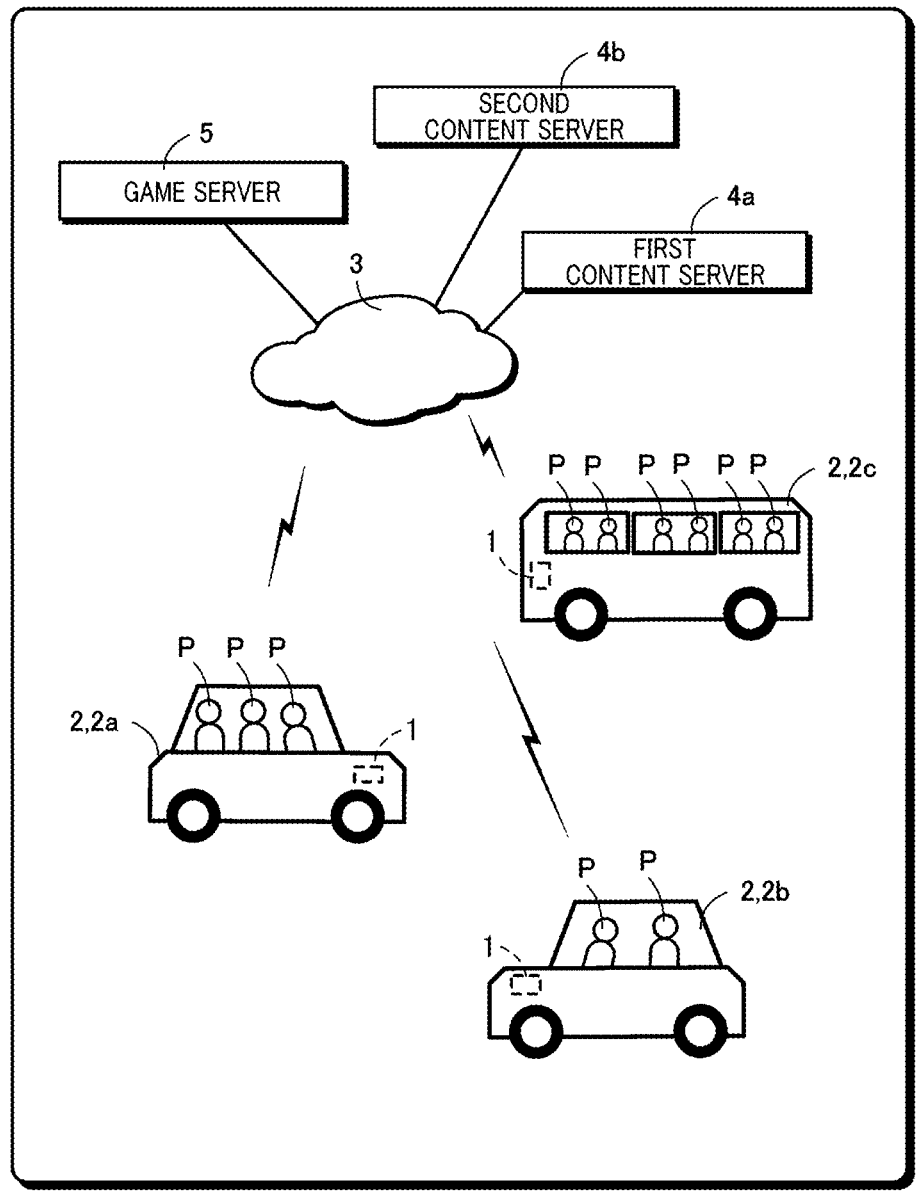
FIG. 1 is a diagram illustrating an example of a scene in which a content output device according to an embodiment of the present invention is used.

FIG. 1 is a diagram illustrating an example of a scene in which a content output device 1 according to an embodiment of the present invention is used. The content output device 1 is mounted in a mobile object 2 in which a plurality of persons ride as passengers P. In the example illustrated in FIG. 1, a three-row passenger vehicle 2a, a two-row passenger vehicle 2b, and a bus 2c are illustrated as examples of the mobile object 2. However, these are examples, and the mobile object 2 may be any vehicle (for example, a share car, a taxi, a passenger bus, and the like) on which a plurality of persons can board.

In addition, the mobile object 2 is not limited to a vehicle, and may be any mobile object on which a plurality of persons can board. In addition to a land mobile object such as a passenger car, a bus, a taxi, or a train, such a mobile object may be a marine mobile object such as a ship or a submersible, an aerial mobile object such as an aircraft or an airship including an eVTOL (Electric Vertical Take-Off and Landing aircraft), or a space mobile object such as a spacecraft or an artificial satellite.

For example, the content output device 1 outputs content provided by a server device (computer) provided outside the mobile object 2, content stored in a storage device provided in the mobile object 2, or the like in the interior of the mobile object 2 according to instructions of the passengers P of the mobile object 2. In the present embodiment, the content refers to any information that can be viewed by a user via the audio-visual device, and is, for example, a movie, an animation, a drama, a game, or the like.

FIG. 1 illustrates a first content server 4a, a second content server 4b, and a game server 5 as examples of a server device that provides content. The content output device 1 is communicably connected to the first content server 4a, the second content server 4b, and the game server 5 by a communication network 3.

The first content server 4a and the second content server 4b are used for different content viewing services (hereinafter, referred to as "viewing service") provided by different content providing companies, respectively. For example, the viewing service may be Netflix, Amazon Prime, Hulu, etc. Hereinafter, the first content server 4a and the second content server 4b are also collectively referred to as a content server 4.

In the present embodiment, for example, content provided by each of the first content server 4a and the second content server 4b can be viewed by the user acquiring an account of a corresponding viewing service in advance and subscribing to the viewing service.

The game server 5 is a server device that provides game content (hereinafter, the content is also referred to as game content), and is operated by, for example, a company that provides a game content providing service. For example, the user can enjoy an online game by accessing the game server 5. In the present embodiment, use of the game content (play of a game) provided by the game server 5 is enabled by the user acquiring an account of a corresponding game providing service in advance and joining the game providing service. In the present embodiment, viewing of the content includes the use of the game content. In the use of the game content, the user views video and sound of the game content.

In the present embodiment, it is assumed that the content provided by the first content server 4a and the second content server 4b is prohibited from being viewed by a person other than the user who has acquired the account (hereinafter, also referred to as an account user) and a family member thereof in the rules of the corresponding viewing service. In addition, the first content server 4a, the second content server 4b, and the game server 5 provide restriction information which is information on restriction regarding viewing of the provided content. The restriction information includes, for example, information regarding viewing restriction set for each content, such as age restriction that is restriction regarding the age of the user who can view the content. The restriction information may also include information regarding viewing restriction according to the rules of the viewing service, for example, information regarding prohibition of viewing by a person other than the account user and the family.

Note that the content output device 1 may communicate with a content server or a game server (both not illustrated) that can be used without account acquisition via the communication network 3, and output content provided by these server devices in the room of the mobile object 2.

The number of content servers and/or game servers connected to the communication network 3 and usable by the content output device 1 is in any number of content servers and/or game servers.

The content output device 1 may also read content from a storage device included in the mobile object 2 or a reading device of a storage medium, and output the content in the room of the mobile object 2.

[1.2 Configuration of Mobile Object]

Next, a configuration of the mobile object 2 in which the content output device 1 is mounted will be described.

Figure 2:
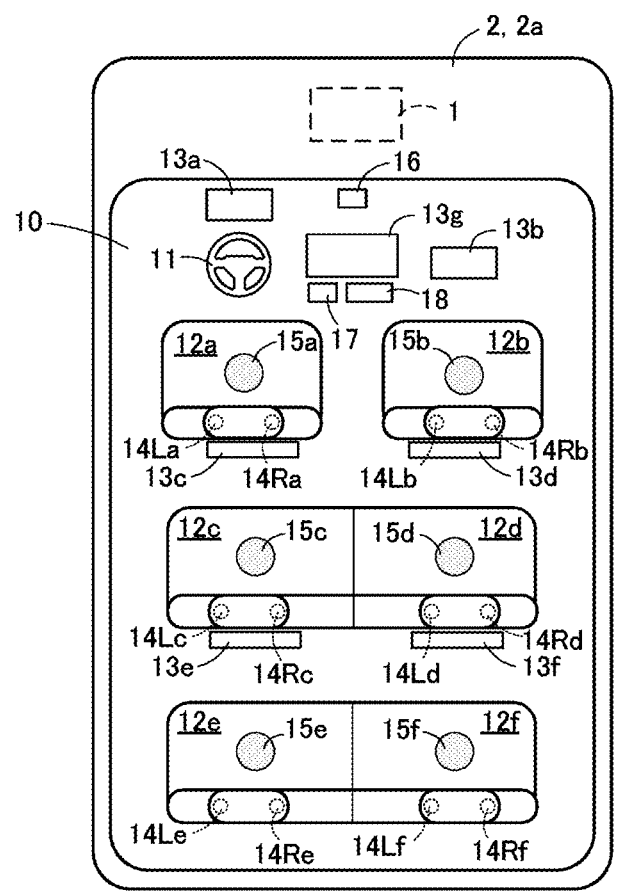
FIG. 2 is a diagram illustrating an example of a configuration of a mobile object in which the content output device is mounted.

FIG. 2 is a diagram illustrating an example of a configuration of the mobile object 2. FIG. 2 illustrates, as an example, a configuration of a mobile object 2a of three row seats, but other mobile objects 2b and 2c may be configured in a similar manner.

In a cabin 10 in which the passengers P of the mobile object 2 are seated, a driver's seat 12a on which a driver operating a steering wheel 11 is seated, a passenger seat 12b, a second-row left seat 12c, a second-row right seat 12d, a third-row left seat 12e, and a third-row right seat 12f are disposed. Hereinafter, the driver's seat 12a, the passenger seat 12b, the second-row left seat 12c, the second-row right seat 12d, the third-row left seat 12e, and the third-row right seat 12f are also collectively referred to as a seat 12.

At a position in front of the driver's seat 12a on an instrument panel (not illustrated) of the mobile object 2, a display device 13a that can be visually recognized by a driver who is a passenger P seated on the driver's seat 12a is disposed. In addition, at a position in front of the passenger seat 12b on the instrument panel, a display device 13b that can be visually recognized by a passenger P seated on the passenger seat 12b is disposed.

In addition, display devices 13c and 13d that can be visually recognized by passengers P seated on the second-row left seat 12c and the second-row right seat 12d are disposed on rear surfaces (surfaces facing a rear side of the mobile object 2) of backrests of the driver's seat 12a and the passenger seat 12b in front of the second-row left seat 12c and the second-row right seat 12d, respectively. In addition, display devices 13e and 13f that can be visually recognized by passengers P seated on the third-row left seat 12e and the third-row right seat 12f are disposed on rear surfaces of backrests of the second-row left seat 12c and the second-row right seat 12d in front of the third-row left seat 12e and the third-row right seat 12f, respectively.

In addition, at a center of the instrument panel of the mobile object 2, a display device 13g, which is a central display device that can be visually recognized by all the passengers P seated on any seats 12, is disposed.

Hereinafter, the display devices 13a, 13b, 13c, 13d, 13e, 13f, and 13g are also collectively referred to as a display device 13. In the present embodiment, the display device 13 is a touch panel. However, the display device 13 is not limited to the touch panel, and may be any type of display device. In addition, all the display devices 13a, 13b, 13c, 13d, 13e, 13f, and 13g do not need to be the same type of display device, and different types of display devices may be mixed. For example, the display device 13a may be a head-up display (HUD) instead of the touch panel.

Speakers 14La and 14Ra, 14Lb and 14Rb, 14Lc and 14Rc, 14Ld and 14Rd, 14Le and 14Re, and 14Lf and 14Rf are disposed inside headrests above the backrests in the driver's seat 12a, the passenger seat 12b, the second-row left seat 12c, the second-row right seat 12d, the third-row left seat 12e, and the third-row right seat 12f, respectively.

Hereinafter, the speakers 14La, 14Lb, 14Lc, 14Ld, 14Le, and 14Lf are also collectively referred to as a speaker 14L, and the speakers 14Ra, 14Rb, 14Rc, 14Rd, 14Re, and 14Rf are also collectively referred to as a speaker 14R. In the following description, the speakers 14R and 4L will also be collectively referred to as a speaker 14.

The speakers 14L and 14R function as a left speaker and a right speaker, respectively, that output stereo sound to the passenger P seated on the corresponding seat 12.

In addition to the speaker 14 that is a headrest speaker, at positions corresponding to parts above the driver's seat 12a, the passenger seat 12b, the second-row left seat 12c, the second-row right seat 12d, the third-row left seat 12e, and the third-row right seat 12f, respectively, on a ceiling surface of the cabin 10, directional speakers 15a, 15b, 15c, 15d, 15e, and 15f outputting sound toward the seats 12 below the positions are provided. Hereinafter, the directional speakers 15a, 15b, 15c, 15d, 15e, and 15f are also collectively referred to as a directional speaker 15.

Further, in the cabin 10 of the mobile object 2, an indoor camera 16 is provided at a position where the passenger P seated on each of the driver's seat 12a, the passenger seat 12b, the second-row left seat 12c, the second-row right seat 12d, the third-row left seat 12e, and the third-row right seat 12f can be imaged. The indoor camera 16 is disposed, for example, above a windshield (that is, a position close to the ceiling of the cabin 10), not illustrated, of the mobile object 2.

The mobile object 2 may also include a media reader 17 that is a reading device of a storage medium such as a USB memory (registered trademark) or an SD memory card (registered trademark) and a CD/DVD drive 18 that is a reading device of a storage medium such as a CD or a DVD at a position below the display device 13g that is a central display device on the instrument panel.

[1.3 Configuration of Content Output Device]

Figure 3:
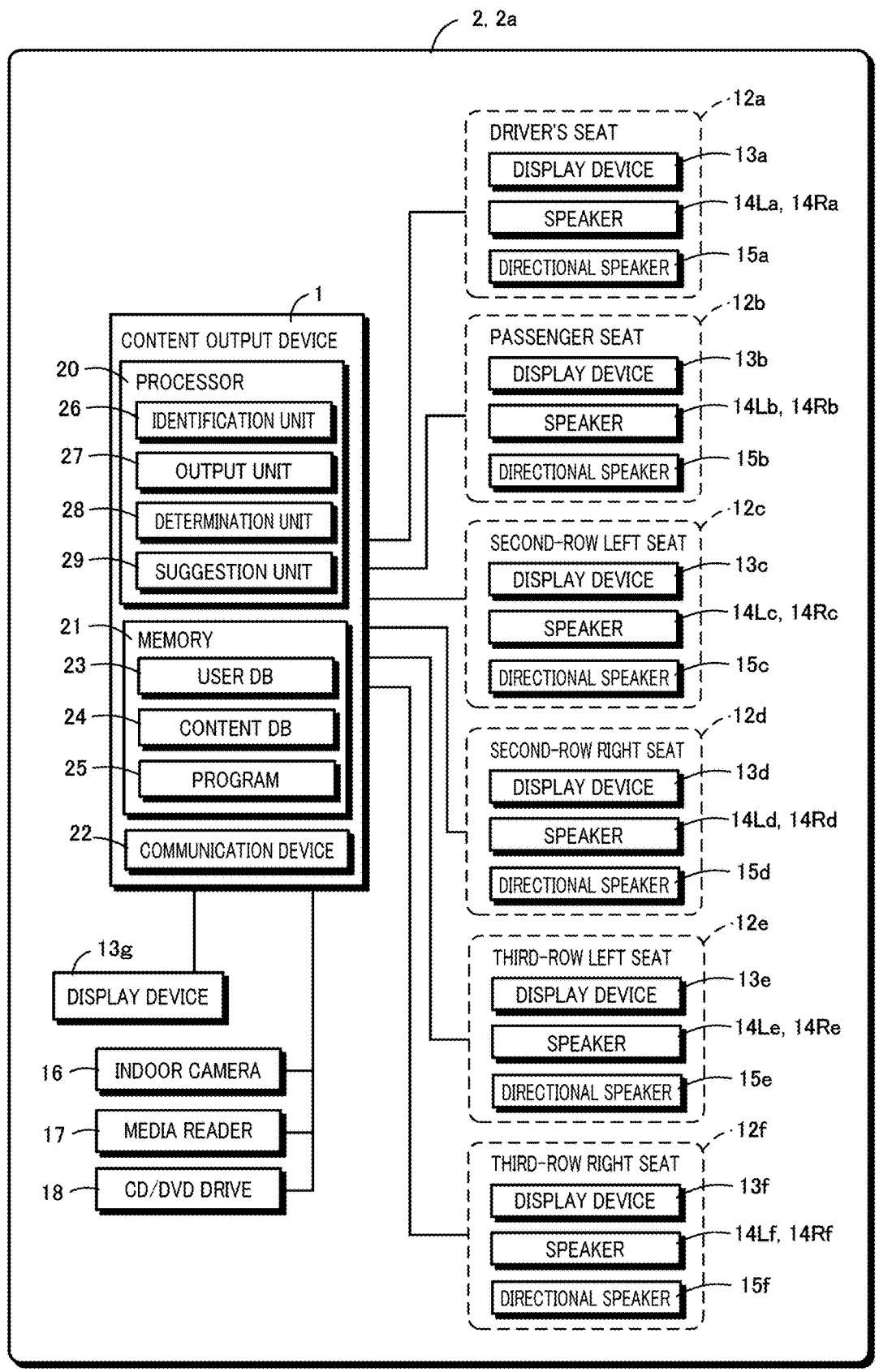
FIG. 3 is a diagram illustrating a configuration of the content output device.

FIG. 3 is a diagram illustrating a configuration of the content output device 1 mounted in the mobile object 2. The content output device 1 includes a processor 20, a memory 21, and a communication device 22. The memory 21 is configured with, for example, a volatile and/or non-volatile semiconductor memory, a hard disk device, or the like.

In the memory 21, a user DB 23 (user database) and a content DB 24 (content database) are stored in advance. In the user DB 23, registration information of a user using the mobile object 2 as the passenger P is stored. The registration information may include a face image and an age of the user, a list of accounts of a subscribed viewing service, and a connection relationship list that is a list of user IDs of users having a connection relationship.

In the content DB 24, content such as a movie or a game may be stored in advance.

The communication device 22 is a transceiver (transmitter/receiver, circuit) for the content output device 1 to wirelessly communicate with an external device (including the content server 4 and the game server 5) via the communication network 3. Furthermore, the communication device 22 may include a transceiver for performing short-range wireless communication such as Bluetooth (registered trademark) with a terminal device (not illustrated) possessed by the passenger P when the passenger P boards the mobile object 2.

The processor 20 is, for example, a computer including a central processing unit (CPU) and the like. The processor 20 may have a configuration including a read only memory (ROM) in which a program is written, a random access memory (RAM) for temporary storage of data, and the like. Further, the processor 20 includes an identification unit 26, an output unit 27, a determination unit 28, and a suggestion unit 29 as functional elements or functional units.

These functional elements included in the processor 20 are realized, for example, by the processor 20, which is a computer, executing the program 25 stored in the memory 21. Note that the program 25 can be stored in any computer-readable storage medium. Alternatively, all or some of the functional elements included in the processor 20 may be configured by hardware including one or more electronic circuit components.

The identification unit 26 identifies each passenger P seated on each seat 12 of the mobile object 2 and acquires identification information regarding content viewing for each passenger P.

In the present embodiment, the identification information includes the age of the corresponding passenger P, a seat position (that is, a seating position) in the cabin 10, information on whether or not the passenger P is in a viewable state, service subscription information which is the information on the viewing service to which the passenger P subscribes, and connection relationship information which is the information on a connection relationship with another passenger P.

In the above description, the "information on whether or not the passenger P is in the viewable state" can be, for example, information on whether or not the passenger P is sleeping. Furthermore, the "information regarding a connection relationship" can be, for example, information regarding the presence or absence of a parent-child relationship or a family relationship.

For example, the identification unit 26 acquires an image of the inside of the cabin 10 by the indoor camera 16, and acquires a face image of each of the passengers P seated in the cabin 10 from the acquired image. The identification unit 26 refers to the user DB 23 stored in the memory 21, collates the acquired face image with a face image of each user stored in the user DB 23, and acquires a user ID of each passenger P, thereby identifying each passenger P.

The identification unit 26 acquires registration information for each of the identified passengers P from the user DB 23. As described above, the registration information may include the age of the passenger P, the list of accounts of the viewing service to which the passenger P subscribes, and the connection relationship list that is a list indicating the user ID of the user having the connection relationship and the type of the connection relationship. The identification unit 26 determines the presence or absence of a connection relationship with another passenger P on the basis of the user ID and the connection relationship list of each passenger P.

In addition, the identification unit 26 identifies the seat 12 of each passenger P in the cabin 10 from the image in the cabin 10 acquired from the indoor camera 16. In addition, the identification unit 26 determines whether or not each passenger P is in a sleep state from the face image of each passenger P acquired from the image.

Then, the identification unit 26 acquires, for each passenger P, information of the seat 12 as the seating position of the passenger P, the age of the passenger P, a list of accounts of the viewing service to which the passenger P subscribes, a list of user IDs of other passengers P having a predetermined connection relationship with the passenger P, and information on whether or not the passenger P is in the viewable state in which the passenger P can view the content as the identification information.

Here, the "list of accounts of the subscribed viewing service" corresponds to the service subscription information in the present disclosure. In addition, the "list of user IDs of other passengers P having a predetermined connection relationship with the passenger P" corresponds to "information on a relationship with other passengers P" of the passenger P in the present disclosure. Furthermore, a parent-child relationship or a family relationship corresponds to the "predetermined connection relationship" in the present disclosure. Furthermore, in the present embodiment, the "information regarding whether or not the passenger P is in the viewable state in which the passenger P can view the content" is, for example, information regarding whether or not the passenger P is in the sleep state.

The output unit 27 outputs, as target content, content designated by the passenger P of the mobile object 2 to the display device 13 mounted in the mobile object 2. For example, according to the related art, the output unit 27 displays a list of accessible contents (hereinafter, also referred to as a content list) on the display device 13 in front of the seat 12 in response to an instruction of the passenger P seated on the seat 12.

The input of the instruction to display the content list to the output unit 27 can be performed by, for example, operating a button displayed on the display device 13 which is a touch panel.

The content list may include, for example, a list of contents provided by the first content server 4a, the second content server 4b, and the game server 5 with which the content output device 1 can communicate using the communication device 22, a list of contents stored in the content DB 24 stored in the memory 21, and a list of names of contents stored in a storage medium inserted in the media reader 17 and the CD/DVD drive 18.

In addition, the list of the contents may include information of categories of the respective contents. The category may represent a content type such as "movie", "drama", or "game". Alternatively, the category may include a content category of the content, such as "horror movie", "action movie", "love drama", or "role playing game".

According to the related art, the output unit 27 can access the content server 4 related to the viewing service to which the passenger P who has given the instruction to display the content list subscribes and acquire a name and a category of the content provided by the viewing service. In addition, according to the related art, the output unit 27 can access the game server 5, the content DB 24, and the storage media inserted into the media reader 17 and the CD/DVD drive 18 to acquire a name of content that can be provided by each of the accessed ones and information on a category of the content.

The output unit 27 can access the content server 4 and the game server 5 related to the viewing service to which the passenger P subscribes on the basis of the service subscription information included in the identification information of the passenger P who has given the instruction to display the content list among the identification information acquired by the identification unit 26 (for example, by using various accounts of the passenger P included in the service subscription information).

The passenger P who has given the display instruction of the content list designates desired content from the content list displayed on the display device 13 which is a touch panel, and instructs the output unit 27 to output the designated content. The output unit 27 outputs, as target content, the designated content to the display device 13. Hereinafter, the passenger P who has designated the target content is referred to as a "target user".

Specifically, when the target content designated by the target user is content provided by the viewing service, the output unit 27 acquires, from the content server 4 of the corresponding viewing service, the restriction information regarding viewing of the target content and the data (including video data, audio data, and the like) necessary for outputting the content by using an account of the target user on the basis of the service subscription information of the target user.

The "restriction information" related to the viewing of the target content includes at least information of appreciation age restriction or a recommended target age (so-called R designation). The restriction information may also include information regarding details of the content, such as "violent scenes", "sexual content", and the like.

In the present embodiment, in particular, the output unit 27 outputs the target content to the display device 13 when output of the target content is permitted according to a determination result on whether or not to permit output of the target content in the determination unit 28 described later. Specifically, the output unit 27 determines the display device 13 disposed at a position in the cabin 10 visible from a seating position of the target user as a target display device to which the target content is to be output.

The output unit 27 determines, for example, the display device 13 in front of the target user seated on the seat 12 as the target display device. More specifically, for example, when the target user is seated on the second-row left seat 12c, the output unit 27 can determine the display device 13c disposed on the rear surface of the backrest of the driver's seat 12a in front of the target user as the target display device.

The output unit 27 outputs the target content to the determined target display device.

On the other hand, when the determination unit 28 does not permit the output of the target content, the output unit 27 does not output the target content to the display device 13. In this case, the output unit 27 may display, on the target display device, a display indicating that the designated target content cannot be output.

In addition, when the determination unit 28 determines to permit the output of the target content and the passengers P include a restriction target person, the output unit 27 decreases an output level of reproduction sound of the target content output from the speaker 14 to a level lower than a predetermined level. Alternatively, the output unit 27 may output the reproduction sound of the target content toward the seating position of the target user by the directional speaker 15. Specifically, for example, the output unit 27 outputs the reproduction sound by the directional speaker 15 disposed above the seat 12 on which the target user is seated so that the passenger P other than the target user cannot hear the reproduction sound.

As a result, not only video output of the target content but also output of the reproduction sound is controlled, so that the target content can be output so that the viewing restriction and the access restriction on the target content can be more appropriately observed.

The determination unit 28 acquires the identification information of each passenger P from the identification unit 26, acquires the restriction information regarding viewing of the target content via the output unit 27, and determines whether or not to permit output of the target content by the output unit 27 on the basis of the acquired restriction information and identification information.

For example, on the basis of the identification information of each passenger P, the determination unit 28 determines whether or not a restriction target person who needs to be restricted from viewing the target content in accordance with the restriction information of the target content is included in the passengers P seated on the seats 12 where the display device 13 as the target display device is visually recognizable. Then, when the restriction target person is included in the passengers P seated on the seats where the target display device is visually recognizable, the determination unit 28 does not permit the output of the target content to the target display device.

As a result, the content output device 1 can appropriately observe the viewing restriction on the content.

Hereinafter, the seat 12 where the display device 13 as the target display device is visually recognizable is also referred to as a visually recognizable seat.

For each display device 13, which seat 12 is the visually recognizable seat can be determined in advance. For example, the visually recognizable seat for one display device 13 disposed in front of any one seat 12 can be the one seat 12, another seat 12 on the right side or the left side of the one seat 12, and another seat 12 in the next back row of the one seat 12. That is, for example, the visually recognizable seat of the display device 13*d* arranged in front of the second-row right seat 12*d* can be the second-row right seat 12*d*, the second-row left seat 12*c* on the left side of the second-row right seat 12*d*, and the third-row left seat 12*e* and the third-row right seat 12*f* that are one row behind the second-row right seat 12*d*, that is, on the third row.

However, the above-described method of determining the visually recognizable seat is an example, and the visually recognizable seat for each display device 13 can be arbitrarily determined in advance according to a configuration and arrangement of the seat 12 and arrangement of the display device 13 in the cabin 10.

When determining whether or not the restriction target person is included in the passengers P seated on the visually recognizable seats, the determination unit 28 may exclude a passenger not in a viewable state from the determination target among the passengers P.

As a result, it is possible to appropriately observe the viewing restriction on the content without unnecessarily restricting the output of the content.

Specifically, the determination unit 28 can determine whether or not the passenger P is in the viewable state on the basis of the information on whether or not the passenger P is in the viewable state in which the passenger P can view the content included in the identification information of each passenger P. As described above, in the present embodiment, the "information regarding whether or not the passenger P is in the viewable state in which the passenger P can view the content" is information regarding whether or not the passenger P is in the sleep state. The determination unit 28 determines that the passenger P in the sleep state is the passenger who is not in the viewable state, and excludes the passenger P from a target of determination as to whether or not the passenger P is the restriction target person.

Further, when the target content is content provided from one viewing service to which the target user subscribes, the determination unit 28 determines whether or not to permit the output of the target content by the output unit 27 on the basis of the service subscription information and the connection information included in the identification information of each passenger P.

As a result, it is possible to appropriately observe the access restriction on the content.

For example, when the target content is content provided from one viewing service to which the target user subscribes, the determination unit 28 determines whether or not a person who does not have a predetermined connection relationship with the target user is included in the passengers P seated on the visually recognizable seats for the display device 13 as the target display device on the basis of the service subscription information and the connection information of each of the passengers P. Then, when the passengers P seated on the visually recognizable seats include a person not having a predetermined connection relationship with the target user, the person not having the connection relationship is determined as the restriction target person who needs to be restricted from viewing the target content, and output of the target content by the output unit 27 is not permitted. As described above, in the present embodiment, the predetermined connection relationship is, for example, a parent-child relationship or a family relationship.

However, even when the target content is content provided from one viewing service to which the target user subscribes and the passengers P seated on the visually recognizable seats of the target display device include a person not having the predetermined connection relationship with the target user, if all the passengers P not having the predetermined connection relationship with the target user among the passengers P seated on the visually recognizable seats subscribe to the one viewing service or have the predetermined connection relationship with other passengers P subscribing to the one viewing service, the determination unit 28 permits output of the target content by the output unit 27.

As a result, it is possible to execute content output according to the desire of the passenger P while appropriately observing the access restriction for the content.

Further, when determining to permit the output unit 27 to output the target content, the determination unit 28 determines whether or not there is a passenger P who can be the restriction target person among the passengers P seated on the seat 12 that are not the visually recognizable seats for the target display device. Then, the output unit 27 is notified that there is the passenger P who can be the restriction target person among the passengers P seated on the seats 12 that are not the visually recognizable seats.

The suggestion unit 29 makes a suggestion related to output of content to the passenger P.

Specifically, when the determination unit 28 determines not to permit the output of the target content, the suggestion unit 29 suggests, to the passenger P who is the target user, alternative content that can be permitted to be output instead of the target content or a countermeasure for permitting the output of the target content. This suggestion can be made, for example, by displaying a message indicating content of the suggestion on the display device 13 which is the target display device.

As a result, it is possible to execute content output according to the desire of each passenger as much as possible while considering viewing restriction and access restriction of the content.

For example, when the determination unit 28 determines not to permit the output of the target content, the suggestion unit 29 suggests, to the target user, content, which has the same details as those of the target content and does not make every passenger P seated on the visually recognizable seats for the target display device be a target of the viewing restriction on the basis of the restriction information of the content, as the substitute content.

Specifically, for example, when the target content is game content, and a different recommended target age according to setting of the game is indicated in the restriction information of the game content, the suggestion unit 29 suggests content, which is the same game content as the target content and in which the game setting is changed to setting different from that of the target content, to the target user as substitute content.

In addition, for example, when the determination unit 28 determines not to permit the output of the target content, the suggestion unit 29 suggests, to the target user, content, which belongs to the same category as that of the target content and does not make every passenger P seated on the visually recognizable seats for the target display device be a target of the viewing restriction on the basis of the restriction information of the content, as substitute content.

Specifically, for example, when the category of the target content is "horror movie" and the determination unit 28 determines not to permit output of the target content due to the appreciation age restriction included in the restriction information of the target content, the suggestion unit 29 suggests, to the target user, content, which belongs to a category "horror movie" that is the same category as that of the target content and excludes all of the passengers P seated on the visually recognizable seats for the target display device from a target of the viewing restriction on the basis of the restriction information of the content, as substitute content. This suggestion can be made, for example, by displaying a message indicating content of the suggestion on the display device 13 which is the target display device. Note that the suggestion unit 29 can search for the substitute content from, for example, the content list generated by the output unit 27.

Furthermore, in a case where the target content is content provided from one viewing service, and the determination unit 28 determines not to permit the output of the target content on the basis of the service subscription information and the connection information included in the identification information of the passenger P, when another viewing service different from the one viewing service provides the same content as the target content, the suggestion unit 29 may suggest the content to the target user as substitute content. For example, the suggestion unit 29 can suggest the same content as the target content provided by the other viewing service to the target user as the substitute content under the condition that all of the passengers P seated on the seats where the target display device is visually recognizable subscribe to the other viewing service or have the predetermined connection relationship with the passenger P subscribing to the other viewing service. The suggestion unit 29 can search for the substitute content from, for example, the content list generated by the output unit 27.

As a result, it is possible to execute content output according to desire of each passenger as much as possible while appropriately observing the access restriction for the content.

In addition, when the determination unit 28 does not permit the output of the target content by the output unit 27, the suggestion unit 29 may suggest that the restriction target person or the target user move to another seat 12 so that the restriction target person cannot visually recognize the target content as a suggestion of a countermeasure for permitting the output of the target content. This suggestion can be made, for example, by displaying a message indicating content of the suggestion on the display device 13g which is the central display device or the display device 13 which is the target display device. The message may include, for example, words indicating a current position of the seat 12 of the restriction target person or the target user and a recommended position of the seat 12 as a movement destination. Specifically, the message may be, for example, "The passenger on the second-row left seat should move to the passenger seat". In addition to the above message, the suggestion unit 29 may display, on the display device 13g, an image indicating movement of the restriction target person or the target user from the current seat 12 to the seat 12 as the recommended movement destination.

Further, in the case where the determination unit 28 does not permit the output of the target content by the output unit 27, when seat movement of a plurality of passengers P is required to permit the output of the target content, the suggestion unit 29 may suggest change of seat arrangement of the passengers P in the cabin 10 of the mobile object 2 as a suggestion of a countermeasure for permitting the output of the target content. This suggestion can be made, for example, by displaying a seat chart illustrating a recommended seat position for each of the passengers P on the display device 13g which is the central display device. For example, the seating chart can include a schematic view illustrating a position of each seat 12 in the cabin 10, and a name or a user ID of each passenger P superimposed and displayed at each position of each seat 12 in the schematic view.

[1.4 Operation of Content Output Device]

Figure 4:
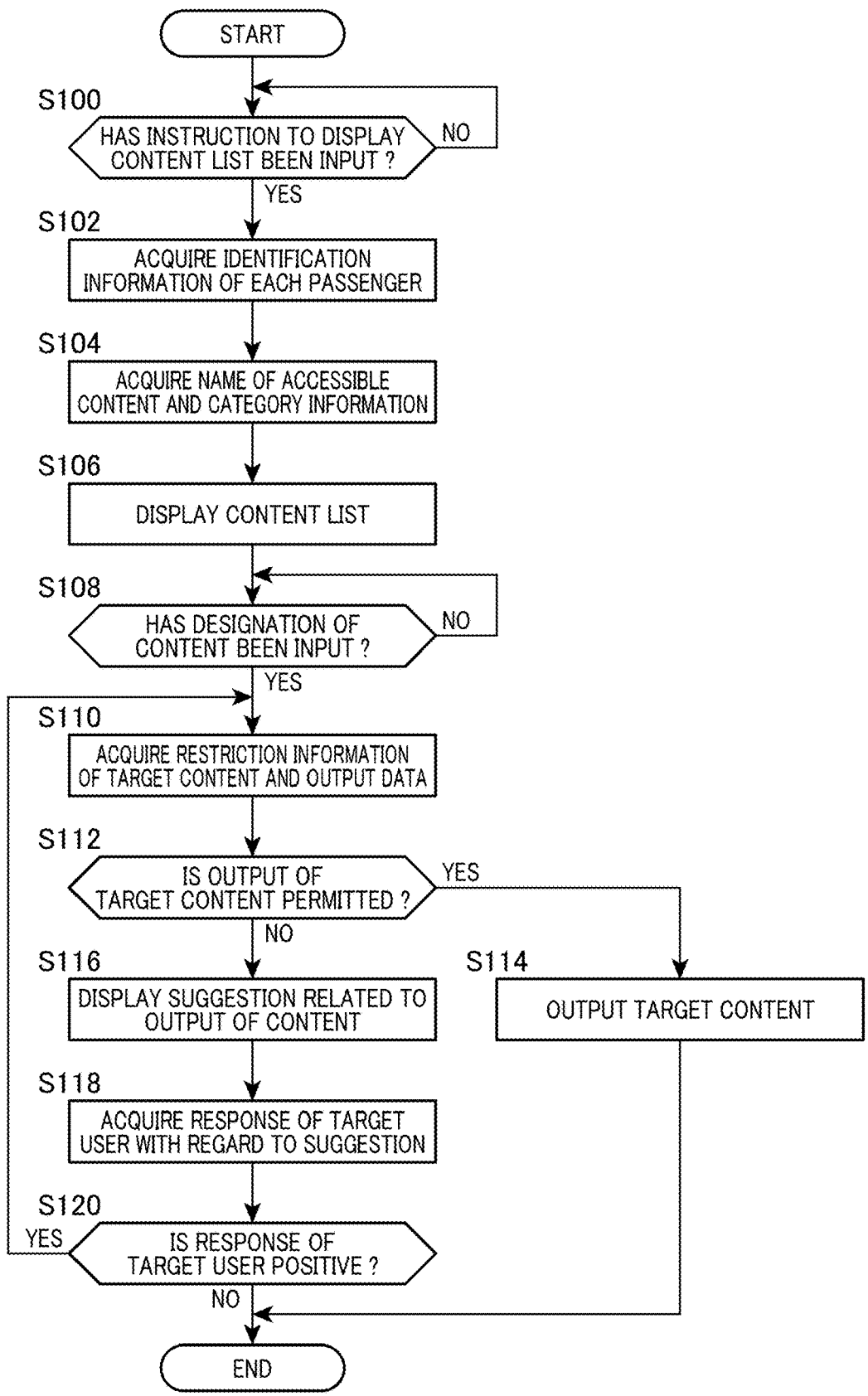
FIG. 4 is a flowchart illustrating a procedure of an operation of the content output device.

Next, an operation of the content output device 1 will be described. FIG. 4 is a flowchart illustrating a procedure of a content output method executed by the processor 20 that is a computer of the content output device 1. The processing illustrated in FIG. 4 is started when power of the mobile object 2 is turned on and power of each of devices including the content output device 1 mounted in the mobile object 2 is turned on, and thereafter, is repeatedly executed until the power of the mobile object 2 is turned off.

Referring to FIG. 4, when the processing is started, the identification unit 26 of the content output device 1 determines whether or not an instruction to display the content list has been input to any of the display devices 13 that are touch panels (S100). When the instruction to display the content list is not input (S100, NO), the identification unit 26 repeats the processing of step S100 and waits until the instruction to display the content list is input.

On the other hand, when the instruction to display the content list to any display device 13 is input (S100, YES), the identification unit 26 identifies each passenger P seated on each seat 12 of the mobile object 2 and acquires identification information regarding content viewing for each passenger P (S102). Next, in response to the input of the instruction to display the content list, the output unit 27 accesses the content server 4, the game server 5, the content DB 24, and the storage medium inserted into the media reader 17 and/or the CD/DVD drive 18, and acquires a list of names of accessible content and category information of each content (S104). The output unit 27 displays a content list including the acquired list of content names on the display device 13 to which the display instruction is input (S106).

Next, the output unit 27 determines whether or not designation of content to be output has been input from the display device 13 that has displayed the content list (S108). When the designation of the content has not been input (S108, NO), the output unit 27 repeats the processing of step S108 and waits for the designation of the content to be input.

On the other hand, when the designation of the content has been input (S108, YES), the output unit 27 sets the designated content as the target content, accesses the content server 4, the game server 5, or the storage medium inserted into the media reader 17 or the CD/DVD drive 18, and acquires restriction information of the target content and output data (S110). As described above, in the present embodiment, the passenger P who has input the designation of the content is referred to as a target user.

Next, the determination unit 28 determines whether or not to permit the output of the target content in output unit 27 on the basis of the restriction information of the target content acquired through the output unit 27 and the identification information acquired in step S102 (S112).

Then, when the determination unit 28 determines to permit the output of the target content (S112, YES), the display device 13 arranged in front of the seat 12 of the target user is set as a target display device, and the target content is output to the target display device (S114). When the output of the target content is ended, the output unit 27 ends the present processing.

On the other hand, when the determination unit 28 determines not to permit the output of the target content in step S112 (S112, NO), the suggestion unit 29 makes a suggestion related to the output of the content to the passenger P (S116). The suggestion can be made, for example, by message display and/or image display on the display device 13 that is the target display device or the display device 13g that is the central display device. As described above, the suggestion may be a suggestion of alternative content instead of the target content or a suggestion of a countermeasure for permitting the output of the target content.

Subsequently, the suggestion unit 29 acquires a response input from the target user with respect to the suggestion (S118). The response can be input via the display device 13 that is the target display device, for example. The suggestion unit 29 determines whether or not the input response from the target user is positive (S120). For example, when the suggestion is a suggestion for alternative content, the positive response is a response indicating that the alternative content is accepted as the target content. Furthermore, for example, when the suggestion is a countermeasure for permitting the output of the target content, the response can be a response indicating that execution of the countermeasure has been completed.

When the response input from the target user is positive (S120, YES), the suggestion unit 29 instructs the output unit 27 to output content according to the suggestion, and the process proceeds to step S110. Here, the "output of the content according to the suggestion" refers to outputting the substitute content as the target content when the suggestion of the substitute content is accepted, and refers to output of content set as the target content in step S110 when the suggestion of the countermeasure is accepted.

When the process proceeds to step S110, the identification unit 26 may newly detect a seat position of each passenger P and update the identification information of each passenger P on the basis of information of the detected seat position.

On the other hand, when the response input from the target user is negative in step S120 (S120, NO), the suggestion unit 29 terminates the present processing. In this instance, the suggestion unit 29 may display a message indicating that the target content cannot be output on the display device 13 which is the target display device.

Here, steps S104, S112, and S114 illustrated in FIG. 4 correspond to an identification step, a determination step, and an output step in the present disclosure, respectively.

2. Other Embodiments

In the embodiment described above, the identification unit 26 acquires the identification information of the passenger P using the information obtained from the user DB 23 stored in the memory 21 on the basis of the face image of the passenger P acquired by the indoor camera 16. However, the identification information is not limited to the information stored in the user DB 23, and may be acquired using information obtained from a mobile terminal such as a smartphone carried by the passenger P.

The present invention is not limited to the configuration of the above embodiment, and can be practiced in various embodiments without departing from the gist thereof.

3. Configurations Supported by Above-Described Embodiments

The above-described embodiments support the following Configurations.

(Configuration 1) A content output device including an output unit configured to output, as target content, content designated by a passenger of a mobile object to a display device mounted in the mobile object, an identification unit configured to identify each of passengers seated on each of seats of the mobile object and acquire identification information regarding content viewing for each of the passengers, and a determination unit configured to determine whether or not to permit output of the target content by the output unit on the basis of the identification information and restriction information regarding viewing of the target content, the content output device further includes a suggestion unit configured to make a suggestion related to output of content to a passenger, wherein when the determination unit determines not to permit the output of the target content, the suggestion unit suggests substitute content for the target content or suggests a countermeasure for permitting the output of the target content to the passenger.

According to the content output device of Configuration 1, in a mobile object in which a plurality of persons ride as passengers, when target content designated by one passenger cannot be output in a mode in which another passenger can visually recognize the target content due to viewing restriction or access restriction of the target content, a suggestion related to content output is made. For this reason, in the content output device of Configuration 1, it is possible to execute content output according to the desire of each passenger while considering viewing restriction and access restriction of the content.

(Configuration 2) The content output device according to Configuration 1, wherein the identification information generated by the identification unit includes information of a seat position of a corresponding passenger in an interior of the mobile object, the output unit sets, as a target display device to which the target content is to be output, a display device arranged at a position in the interior visually recognizable from a seating position of a target user who is a passenger designating the target content, and the determination unit determines, on the basis of the identification information, whether or not a restriction target person whose viewing of the target content is to be restricted according to the restriction information is included in passengers sitting on seats where the target display device is visually recognizable, and does not permit output of the target content to the target display device when the restriction target person is included.

According to the content output device of Configuration 2, it is possible to appropriately observe the viewing restriction on the content.

(Configuration 3) The content output device according to Configuration 2, wherein the identification information generated by the identification unit includes information on whether or not a corresponding passenger is in a viewable state in which the passenger can view content, and the determination unit excludes a passenger who is not in the viewable state from a target of determination as to whether or not the passenger is the restriction target person.

According to the content output device of Configuration 3, it is possible to appropriately observe the viewing restriction on the content without unnecessarily restricting the output of the content.

(Configuration 4) The content output device according to Configuration 2 or 3, wherein, when the determination unit determines not to permit output of the target content, the suggestion unit suggests, to a passenger, content, which has the same details as details of the target content and does not make a passenger seated on a seat where the target display device is visually recognizable be a target of the viewing restriction on the basis of restriction information of the content, as the substitute content.

According to the content output device of Configuration 4, it is possible to execute content output according to desire of each passenger while appropriately observing the viewing restriction for the content.

(Configuration 5) The content output device according to any one of Configurations 2 to 4, wherein, when the determination unit determines not to permit output of the target content, the suggestion unit suggests, to a passenger, content, which belongs to the same category as a category of the target content and does not make a passenger seated on a seat where the target display device is visually recognizable be a target of the viewing restriction on the basis of restriction information of the content, as the substitute content.

According to the content output device of Configuration 5, it is possible to execute content output according to desire of each passenger while appropriately observing the viewing restriction for the content.

(Configuration 6) The content output device according to any one of Configurations 2 to 5, wherein the identification information generated by the identification unit includes service subscription information that is information of a viewing service to which a corresponding passenger subscribes and connection information that is information of a connection relationship with another passenger, and when the target content is content provided from one viewing service to which the target user subscribes, the determination unit determines whether or not to permit output of the target content by the output unit on the basis of the service subscription information and the connection information of each passenger.

According to the content output device of Configuration 6, it is possible to appropriately observe the access restriction on the content.

(Configuration 7) The content output device according to configuration 6, wherein, when the target content is content provided from one viewing service to which the target user subscribes, and when a person not having a predetermined connection relationship determined in advance with the target user is included in passengers seated on seats where the target display device is visually recognizable on the basis of the service subscription information and the connection information of each passenger, the determination unit determines that the person not having the connection relationship to be a restriction target person to be restricted from viewing the target content, and does not permit output of the target content by the output unit.

According to the content output device of configuration 7, it is possible to appropriately observe the access restriction on the content.

(Configuration 8) The content output device according to Configuration 7, wherein, even when the target content is content provided from one viewing service to which the target user subscribes and a person not having the predetermined connection relationship with the target user is included in passengers seated on seats where the target display device is visually recognizable, when all passengers not having the predetermined connection relationship with the target user among the passengers seated on the seats where the target display device is visually recognizable subscribe to the one viewing service or are persons having the predetermined connection relationship with another passenger subscribing to the one viewing service, the determination unit permits output of the target content by the output unit.

According to the content output device of Configuration 8, it is possible to execute content output according to desire of each passenger while appropriately observing the access restriction for the content.

(Configuration 9) The content output device according to Configuration 8, wherein, in a case where the target content is content provided from one viewing service, and the determination unit determines not to permit the output of the target content on the basis of the service subscription information and the connection information included in the identification information, when another viewing service different from the one viewing service provides the same content as the target content, the suggestion unit suggests the same content as the target content provided by the other viewing service to the passenger as the substitute content under condition that all passengers seated on the seats where the target display device is visually recognizable subscribe to the other viewing service or have the predetermined connection relationship with a passenger subscribing to the other viewing service.

According to the content output device of Configuration 9, it is possible to output content according to desire of each passenger while appropriately observing the access restriction for the content.

(Configurations 10) The content output device according to any one of Configurations 2 to 9, wherein, when the determination unit does not permit the output of the target content by the output unit, the suggestion unit suggests that the restriction target person or the target user move seats so that the restriction target person is not allowed to visually recognize the target content as a suggestion of the countermeasure for permitting the output of the target content.

According to the content output device of Configuration 10, it is possible to output content desired by each passenger while appropriately observing the access restriction for the content.

(Configuration 11) The content output device according to any one of Configurations 2 to 9, wherein, in a case where the determination unit does not permit the output of the target content by the output unit, when seat movement of a plurality of passengers is required to permit the output of the target content, the suggestion unit suggests change of seat arrangement of the passengers in the interior of the mobile object as a suggestion of the countermeasure for permitting the output of the target content.

According to the content output device of Configuration 11, it is possible to output content desired by each passenger while appropriately observing the access restriction for the content.

(Configurations 12) The content output device according to any one of Configurations 2 to 11, wherein, when the determination unit determines to permit the output of the target content and the passengers of the mobile object include the restriction target person, the output unit decreases an output level of reproduction sound of the target content to a level lower than a predetermined level or outputs the reproduction sound toward a seating position of the target user by a directional speaker.

According to the content output device of Configuration 12, not only video output of the target content but also output of the reproduction sound is controlled, so that the content can be output so that the viewing restriction and the access restriction on the content can be more appropriately observed.

(Configuration 13) A content output method executed by a computer of a content output device configured to output content designated by a passenger of a mobile object to a display device mounted in the mobile object, the content output method including an output step of outputting, as target content, content designated by a passenger of the mobile object to the display device, an identification step of identifying each of passengers seated on each of seats of the mobile object and acquiring identification information regarding content viewing for each of the passengers, and a determination step of determining whether or not to permit output of the target content in the output step on the basis of the identification information and restriction information regarding viewing of the target content, the content output method further includes a suggestion step of making a suggestion related to output of content to a passenger, and in the suggestion step, wherein when it is determined not to permit the output of the target content in the determination step, substitute content for the target content or a countermeasure for permitting the output of the target content is suggested to the passenger.

According to the content output method of Configuration 13, in a mobile object in which a plurality of persons ride as passengers, when target content designated by one passenger cannot be output in a mode in which another passenger can visually recognize the target content due to viewing restriction or access restriction of the target content, a suggestion related to content output is made. For this reason, in the content output device of Configuration 1, it is possible to execute content output according to the desire of each passenger while considering viewing restriction and access restriction of the content.

REFERENCE SIGNS LIST

1 Content output device
2 Mobile object
3 Communication network
4 Content server
4a First content server
4b Second content server
5 Game server
10 Cabin
11 Steering wheel
12 Seat
12a Driver's seat
12b Passenger seat
12c Second-row left seat
12d Second-row right seat
12e Third-row left seat
12f Third-row right seat
13, 13a, 13b, 13c, 13d, 13e, 13f, 13g Display device
14, 14L, 14R, 14La, 14Lb, 14Lc, 14Ld, 14Le, 14Lf, 14Ra, 14Rb, 14Rc, 14Rd, 14Re, 14Rf Speaker
15, 15a, 15b, 15c, 15d, 15e, 15f Directional speaker
16 Indoor camera
17 Media reader
18 CD/DVD drive
20 Processor
21 Memory
22 Communication device
23 User DB (user database)
24 Content DB (content database)
25 Program
26 Identification unit
27 Output unit
28 Determination unit
29 Suggestion unit
P Participant

What is claimed is:

1. A content output device comprising:
an output unit configured to output, as target content, content designated by a passenger of a mobile object to a display device mounted in the mobile object;
an identification unit configured to identify each of passengers seated on each of seats of the mobile object and acquire identification information regarding content viewing for each of the passengers; and
a determination unit configured to determine whether or not to permit output of the target content by the output unit on the basis of the identification information and restriction information regarding viewing of the target content,
the content output device further comprising a suggestion unit configured to make a suggestion related to output of content to a passenger, wherein
when the determination unit determines not to permit the output of the target content, the suggestion unit suggests substitute content for the target content or suggests a countermeasure for permitting the output of the target content to the passenger.

2. The content output device according to claim 1, wherein
the identification information generated by the identification unit includes information of a seat position of a corresponding passenger in an interior of the mobile object,
the output unit sets, as a target display device to which the target content is to be output, a display device arranged at a position in the interior visually recognizable from a seating position of a target user who is a passenger designating the target content, and
the determination unit determines, on the basis of the identification information, whether or not a restriction target person whose viewing of the target content is to be restricted according to the restriction information is included in passengers sitting on seats where the target display device is visually recognizable, and does not permit output of the target content to the target display device when the restriction target person is included.

3. The content output device according to claim 2, wherein
the identification information generated by the identification unit includes information on whether or not a corresponding passenger is in a viewable state in which the passenger can view content, and
the determination unit excludes a passenger who is not in the viewable state from a target of determination as to whether or not the passenger is the restriction target person.

4. The content output device according to claim 2, wherein
when the determination unit determines not to permit output of the target content, the suggestion unit suggests to a passenger, content, which has the same details as details of the target content and does not make a passenger seated on a seat where the target display device is visually recognizable be a target of the viewing restriction on the basis of restriction information of the content, as the substitute content.

5. The content output device according to claim 2, wherein
when the determination unit determines not to permit output of the target content,
the suggestion unit suggests to a passenger, content, which belongs to the same category as a category of the target content and does not make a passenger seated on a seat where the target display device is visually recognizable be a target of the viewing restriction on the basis of restriction information of the content, as the substitute content.

6. The content output device according to claim 2, wherein
the identification information generated by the identification unit includes service subscription information that is information of a viewing service to which a corresponding passenger subscribes and connection information that is information of a connection relationship with another passenger, and
when the target content is content provided from one viewing service to which the target user subscribes, the determination unit determines whether or not to permit output of the target content by the output unit on the basis of the service subscription information and the connection information of each passenger.

7. The content output device according to claim 6, wherein
when the target content is content provided from one viewing service to which the target user subscribes, and when a person not having a predetermined connection relationship determined in advance with the target user is included in passengers seated on seats where the target display device is visually recognizable on the basis of the service subscription information and the connection information of each passenger, the determination unit determines that the person not having the connection relationship to be a restriction target person to be restricted from viewing the target content, and does not permit output of the target content by the output unit.

8. The content output device according to claim 7, wherein
even when the target content is content provided from one viewing service to which the target user subscribes and a person not having the predetermined connection relationship with the target user is included in passengers seated on seats where the target display device is visually recognizable,
when all passengers not having the predetermined connection relationship with the target user among the passengers seated on the seats where the target display device is visually recognizable subscribe to the one viewing service or are persons having the predetermined connection relationship with another passenger subscribing to the one viewing service,
the determination unit permits output of the target content by the output unit.

9. The content output device according to claim 8, wherein in a case where the target content is content provided from one viewing service, and the determination unit determines not to permit the output of the target content on the basis of the service subscription information and the connection information included in the identification information, when another viewing service different from the one viewing service provides the same content as the target content,
the suggestion unit suggests
the same content as the target content provided by the other viewing service to the passenger as the substitute content under condition that all passengers seated on the seats where the target display device is visually recognizable subscribe to the other viewing service or have the predetermined connection relationship with a passenger subscribing to the other viewing service.

10. The content output device according to claim 2, wherein
when the determination unit does not permit the output of the target content by the output unit,
the suggestion unit suggests that
the restriction target person or the target user move seats so that the restriction target person is not allowed to visually recognize the target content as a suggestion of the countermeasure for permitting the output of the target content.

11. The content output device according to claim 2, wherein
in a case where the determination unit does not permit the output of the target content by the output unit, when seat movement of a plurality of passengers is required to permit the output of the target content, the suggestion unit suggests change of seat arrangement of the passengers in the interior of the mobile object as a suggestion of the countermeasure for permitting the output of the target content.

12. The content output device according to claim 2, wherein
when the determination unit determines to permit the output of the target content and the passengers of the mobile object include the restriction target person,
the output unit
decreases an output level of reproduction sound of the target content to a level lower than a predetermined level or outputs the reproduction sound toward a seating position of the target user by a directional speaker.

13. A content output method executed by a computer of a content output device configured to output content designated by a passenger of a mobile object to a display device mounted in the mobile object, the content output method comprising:
an output step of outputting, as target content, content designated by a passenger of the mobile object to the display device;
an identification step of identifying each of passengers seated on each of seats of the mobile object and acquiring identification information regarding content viewing for each of the passengers; and
a determination step of determining whether or not to permit output of the target content in the output step on the basis of the identification information and restriction information regarding viewing of the target content,
the content output method further comprising a suggestion step of making a suggestion related to output of content to a passenger, wherein in the suggestion step, when it is determined not to permit the output of the target content in the determination step, substitute content for the target content or a countermeasure for permitting the output of the target content is suggested to the passenger.

\* \* \* \* \*